(12) United States Patent
Liu et al.

(10) Patent No.: US 7,694,214 B2
(45) Date of Patent: Apr. 6, 2010

(54) MULTIMODAL NOTE TAKING, ANNOTATION, AND GAMING

(75) Inventors: Zicheng Liu, Bellevue, WA (US); Zhengyou Zhang, Bellevue, WA (US); David Kurlander, Seattle, WA (US); David W. Williams, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1316 days.

(21) Appl. No.: 11/172,127

(22) Filed: Jun. 29, 2005

(65) Prior Publication Data

US 2007/0022372 A1 Jan. 25, 2007

(51) Int. Cl.
*G06F 17/00* (2006.01)

(52) U.S. Cl. .................. 715/203; 715/201; 715/273

(58) Field of Classification Search .......... 715/200, 715/201, 202, 203, 204, 230, 232, 233, 273
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,806,079 A * | 9/1998 | Rivette et al. | 715/210 |
| 5,812,865 A | 9/1998 | Theimer et al. | |
| 6,249,765 B1 * | 6/2001 | Adler et al. | 704/500 |
| 6,342,901 B1 * | 1/2002 | Adler et al. | 715/700 |
| 6,389,434 B1 * | 5/2002 | Rivette et al. | 715/209 |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,651,218 B1 * | 11/2003 | Adler et al. | 715/209 |
| 6,675,356 B1 * | 1/2004 | Adler et al. | 715/200 |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 7,215,436 B2 * | 5/2007 | Hull et al. | 358/1.15 |
| 7,260,257 B2 * | 8/2007 | Zhang et al. | 382/165 |
| 7,263,659 B2 * | 8/2007 | Hull et al. | 715/716 |

(Continued)

FOREIGN PATENT DOCUMENTS

WO    WO 9800787    1/1998

OTHER PUBLICATIONS

Andy Harter, et al., A Distributed Location System for the Active Office, IEEE Network, 1994, pp. 62-70.

(Continued)

*Primary Examiner*—Stephen S Hong
*Assistant Examiner*—Gregory J Vaughn
(74) *Attorney, Agent, or Firm*—Lee & Hayes, PLLC

(57) ABSTRACT

A multimodal, multilanguage mobile device which can be employed to enhance note taking and/or annotation of a document, and gaming. Input data types such as optical character recognition (OCR), speech, handwriting, and visual information (e.g., image and/or video), etc., can be fused to generate rich documents with a multidimensional level of data to provide an increased level of context over conventional documents. Such architecture can be utilized by students for homework management, as well as entertainment (e.g., gaming).

18 Claims, 15 Drawing Sheets

U.S. PATENT DOCUMENTS

| | | | | |
|---|---|---|---|---|
| 7,263,671 | B2* | 8/2007 | Hull et al. | 715/839 |
| 2001/0040590 | A1 | 11/2001 | Abbott et al. | |
| 2001/0040591 | A1 | 11/2001 | Abbott et al. | |
| 2001/0043231 | A1 | 11/2001 | Abbott et al. | |
| 2001/0043232 | A1 | 11/2001 | Abbott et al. | |
| 2002/0032689 | A1 | 3/2002 | Abbott, III et al. | |
| 2002/0044152 | A1 | 4/2002 | Abbott, III et al. | |
| 2002/0052930 | A1 | 5/2002 | Abbott et al. | |
| 2002/0052963 | A1 | 5/2002 | Abbott et al. | |
| 2002/0054130 | A1 | 5/2002 | Abbott, III et al. | |
| 2002/0054174 | A1 | 5/2002 | Abbott et al. | |
| 2002/0078204 | A1 | 6/2002 | Newell et al. | |
| 2002/0079371 | A1* | 6/2002 | Bobrow et al. | 235/454 |
| 2002/0080155 | A1 | 6/2002 | Abbott et al. | |
| 2002/0080156 | A1 | 6/2002 | Abbott et al. | |
| 2002/0083025 | A1 | 6/2002 | Robarts et al. | |
| 2002/0083158 | A1 | 6/2002 | Abbott et al. | |
| 2002/0087525 | A1 | 7/2002 | Abbott et al. | |
| 2002/0099817 | A1 | 7/2002 | Abbott et al. | |
| 2003/0046401 | A1 | 3/2003 | Abbott et al. | |
| 2003/0154476 | A1 | 8/2003 | Abbott, III et al. | |
| 2004/0122656 | A1* | 6/2004 | Abir | 704/4 |
| 2005/0034078 | A1 | 2/2005 | Abbott et al. | |
| 2006/0041590 | A1* | 2/2006 | King et al. | 707/104.1 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38- No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36 - No. 7.

Roy Want, et al., The Active Badge Location System, ACM Transactions on Information Systems, Jan. 1992, pp. 91-102, vol. 10 - No. 1.

Mark Weiser, Some Computer Science Issues in Ubiquitous Computing, Communications of the ACM, Jul. 1993, pp. 75-84, vol. 36 - No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Bill N. Schilit, et al., Disseminationg Active Map Information to Mobile Hosts, IEEE Network, 1994, pp. 22-32, vol. 8 - No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 pages.

Robert M. Losee, Jr., Minimizing information overload: the ranking of electronic messages, Journal of Information Science 15, Elsevier Science Publishers B.V., 1989, pp. 179-189.

* cited by examiner

MULTIMODAL NOTE TAKING, ANNOTATION, AND GAMING

BACKGROUND

The advent of global communications networks such as the Internet has served as a catalyst for the convergence of computing power and services in portable computing devices. For example, in the recent past, portable devices such as cellular telephones and personal data assistants (PDAs) have employed separate functionality for voice communications and personal information storage, respectively. Today, these functionalities can be found in a single portable device, for example, a cell phone that employs multimodal functionality via increased computing power in hardware and software. Such devices are more commonly referred to as "smartphones."

Oftentimes, these smartphones are further equipped with built-in digital image capture devices (e.g., cameras) for taking photos or short video clips, and microphones for receiving voice input, together with the computing functionalities of the PDA. The hardware and software features available in these smartphones and similar technologically capable devices provide developers the capability and flexibility to build applications through a versatile platform. Similarly, the built-in digital image capture devices are capable of generating video graphics array (VGA) quality pictures having 640×480 pixel resolution or higher. Many smartphones are capable of taking pictures on the order of one mega-pixel resolution and higher.

With the technological advances in handheld and portable devices, there is an ongoing and increasing need to maximize the benefit of these continually emerging technologies. Given the advances in storage and computing power of such portable wireless computing devices, they now are capable of handling many types of disparate data types such as images, video clips, audio data, and electronic organizers for managing and organizing a variety of PIM (personal information manager) data, for example. However, there does not exist a mechanism whereby such disparate data types can be utilized together.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed innovation comprises a multimodal, multilanguage mobile device which can be employed to enhance note taking and/or annotation of a document, and gaming. Input data types such as optical character recognition (OCR), speech, handwriting, and visual information (e.g., image and/or video), etc., can be fused in various combinations to generate rich documents with a multidimensional level of data to provide an increased level of context over conventional documents. Such architecture can be utilized by students for homework management, as well as entertainment (e.g., gaming).

In another aspect thereof, one or more of the data types can be employed to facilitate retrieving items. For example, in a datastore of rich documents, a user can search by image content, video content, or the like, to return all rich documents that meet the content search criteria.

In yet another aspect of the innovation, one or more of the same inputs can be employed to improve accuracy of an OCR process, for example, by analyzing other input processes and associated content from parallel sources of information (e.g., speech).

In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
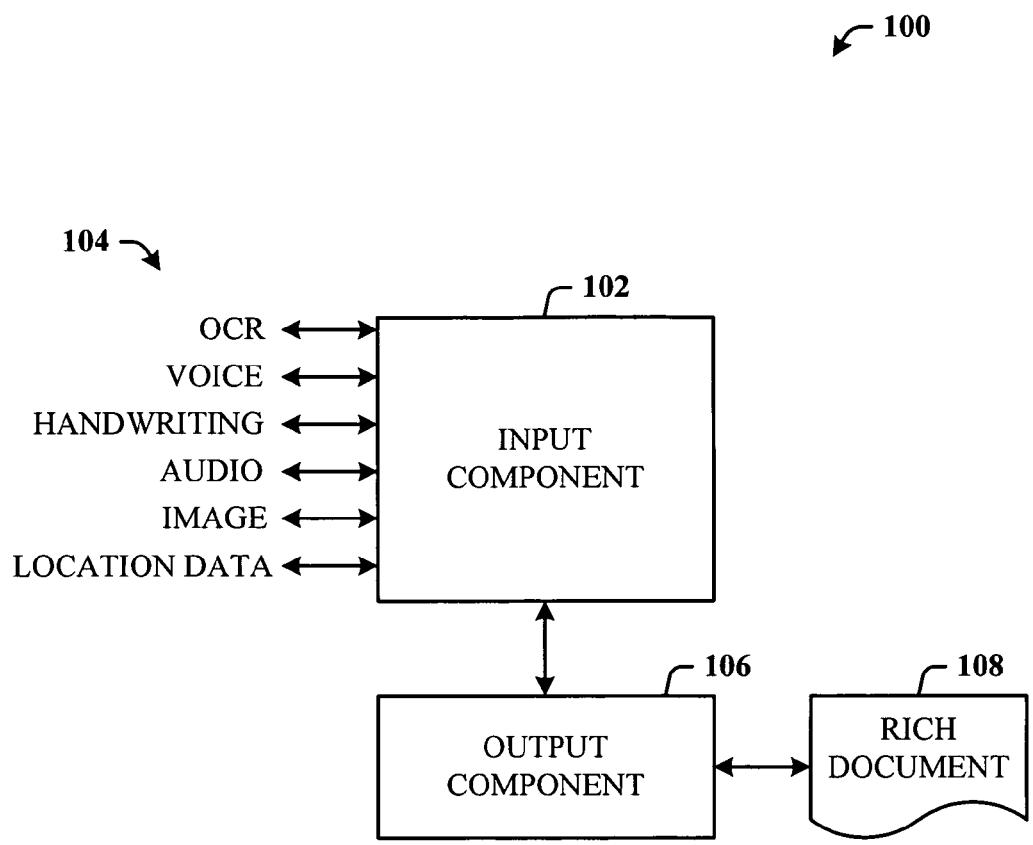
FIG. 1 illustrates a system that facilitates content processing to output a rich document in accordance with the disclosed innovation.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates content processing to output a rich document in accordance with the disclosed innovation. The system 100 includes an input component 102 that receives a plurality of inputs 104 which provide a multidimensional level of data. The dimensions can include optical character recognition (OCR) data, voice data, handwriting data, audio data, location data (e.g., global positioning system-GPS) and image data, for example. In this context, OCR data is that which is typically concerned with the recognition of textual characters, rather than the recognition of graphical images such as in photographs, video content, etc., referred to herein as image data. The OCR data input is employed as a separate input element than that of image data to provide more options for outputting a rich document. Voice data is distinguished from general audio data. Voice or speech data is that of spoken or vocalized words, while general audio data can be music or other non-spoken sounds. This is so that each of audio and voice data can be employed separately or together to provide more options for generating the rich document at the output. The location data can be employed as a tool to further improve OCR and/or speech recognition by providing contextual information. For example, if it is determined from location data that the location is in a foreign country, the corresponding foreign language can be readily retrieved and applied for more accurate and efficient OCR processing. The input component 102 processes data received from the plurality of inputs 104, and outputs the processed data to an output component 106. The output component 106 then formats the processed data into a rich document 108 that can include any combination of the OCR data, voice data, handwriting data, audio data, location data, and image data.

Figure 2:
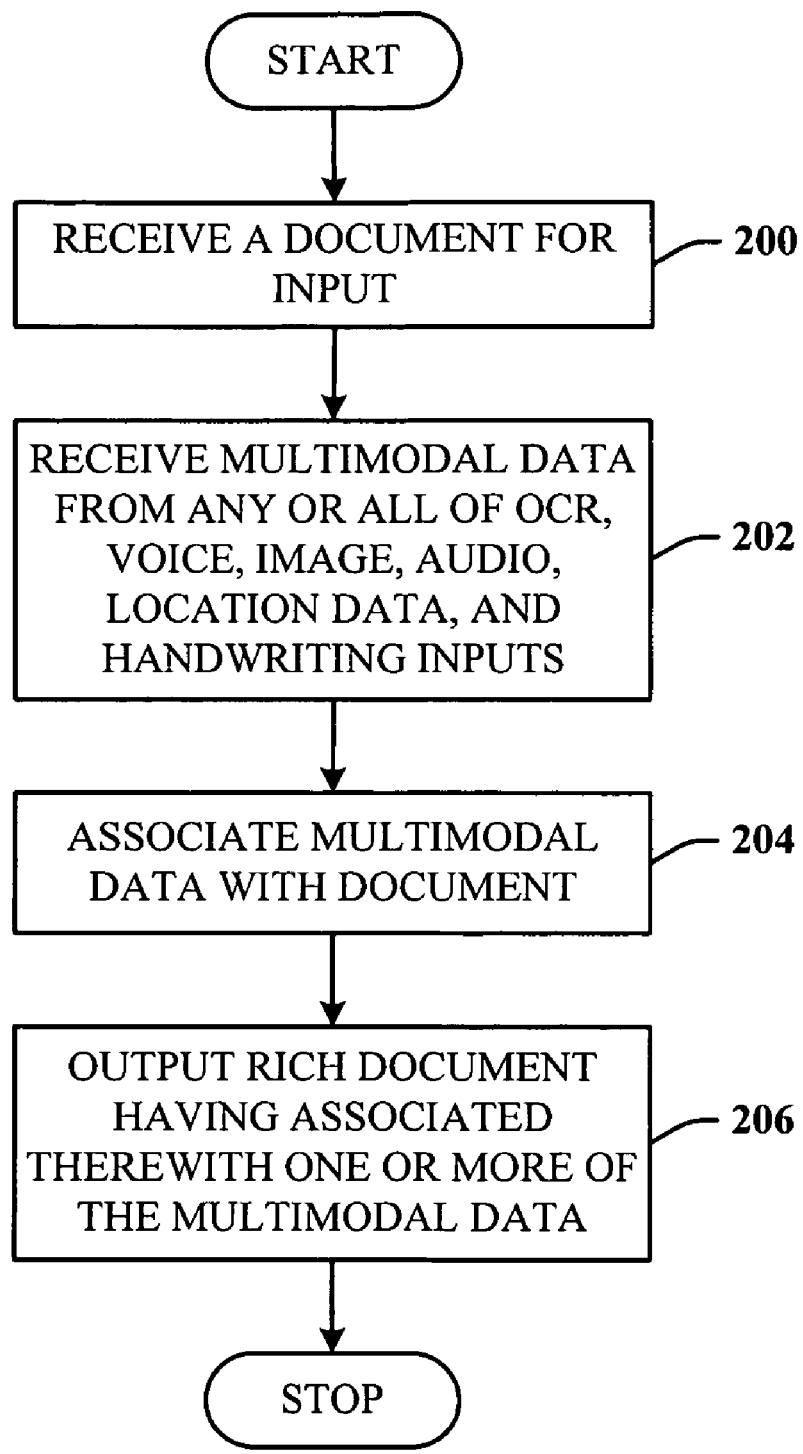
FIG. 2 illustrates a methodology of outputting a rich document of multidimensional data in accordance with an aspect.

FIG. 2 illustrates a methodology of outputting a rich document of multidimensional data in accordance with an aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, an initial document is generated and received for input. At 202, multimodal data is received from any or all of OCR, voice, audio data, location data, image, and handwriting subsystems. At 204, the multimodal data is associated with the document. At 206, a rich document that includes any combination of the multimodal data is output. This association of multimodal data (or content) can facilitate presenting the content in a graphical representation of the rich document such that a viewer can perceive, for example, text, an image, an image link that causes the image or image(s) to be retrieved and presented as part of the document or separate from the document, a video graphic, a video graphic link that causes the associated video or video(s) to be retrieved and presented as part of the document or separate from the document, audio data and/or a link that causes audio data to be played, speech data in the form of an audio file and/or transcribed as part of the document, handwriting data, and/or OCR data. These are only but a few of the input content that can be included with the rich document.

Figure 3:
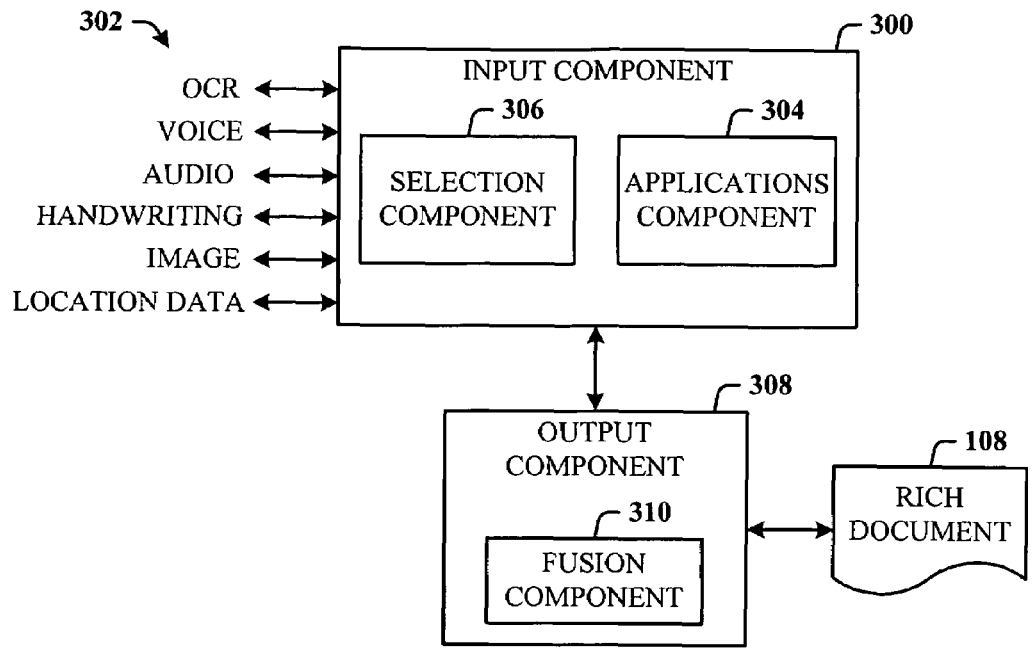
FIG. 3 illustrates an input component that employs selection as a function of an application used to process the document in accordance with another aspect.

Referring now to FIG. 3, there is illustrated an input component 300 that employs selection as a function of an application used to process the document in accordance with another aspect. The input component 300 (similar to input component 102 of FIG. 1), includes one or more interfaces suitable for receiving one or more of the multimodal inputs 302 (similar to inputs 104). The input component 300 comprises an applications component 304 that includes one or more applications that can be launched to initiate creation of a document. For example, the applications component 304 can include a word processing application, a spreadsheet application, a presentation application, an e-mail application, and so on, one or all of which can embed or associate the multimodal data of the inputs 302 with an application document.

The input component 300 can also employ a selection component 306 that interfaces to the applications component 304 such that when the user opens an application, the selection component 306 detects which application is opened for processing, and selects that multimodal data which is compatible for entry in a document of the opened application. In one implementation, only one of the multimodal data is suitable for association with the application document. In another scenario, two or more of the multimodal data can be associated with the application document. In any case, an output component 308 is provided that receives the output of the input component 300, and processes the output data into the rich document 108. The output component 308 includes a fusion component 310 that combines (or fuses) the selected inputs, as selected by the selection component 306, into the rich document 108. The fusion component 308 facilitates the combining of inputs to improve recognition accuracy, for example.

Where a single application is launched for user interaction, the output component 308 can receive the output data directly from the applications component 304. Where multiple applications of the applications component 304 are opened, each of the applications can pass its document (or data) output to the fusion component 310 of the output component 308 for document (or data) fusing to generate the rich document 108.

Figure 4:
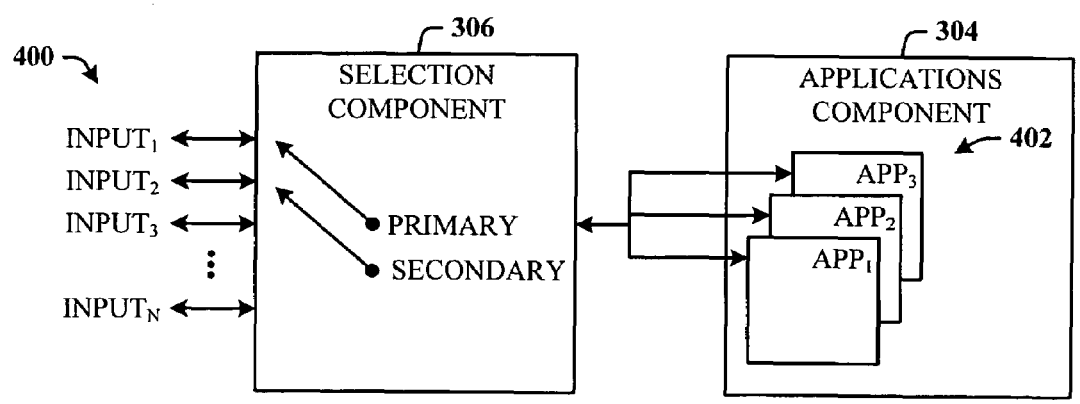
FIG. 4 illustrates a more detailed diagram of the selection component of FIG. 3.

FIG. 4 illustrates a more detailed diagram of the selection component 306 of FIG. 3. The selection component 306 interfaces to the applications component 304 to facilitate input selection of one or more of a plurality of the multimodal inputs 400 (denoted $INPUT_1$, $INPUT_2$, $INPUT_3$, ..., $INPUT_N$, where N is an integer) to one or more applications 402 (denoted APP1, APP2, and APP3) of the applications component 304. It is to be understood that the applications component 304 can include a greater or fewer number of applications, based on the device and/or system in which it is employed.

In this scenario, the selection component 306 includes two selection subcomponents (denoted PRIMARY and SECONDARY) which can operate independently (or dependently) to select one or more of the inputs 400 to be input processed into a document of a corresponding application of the applications 402. For example, a first input ($INPUT_1$) can include OCR data that is selectively routed by the primary subcomponent to the first application ($APP_1$) for processing, while a second input ($INPUT_2$) is selected by the secondary subcomponent for routing to a corresponding second application ($APP_2$), and so on. It is to be understood that a third application (e.g., $APP_3$) can be sufficiently robust to handle several different kinds of multimodal data, such that the primary subcomponent selects the second input ($INPUT_2$) (e.g., speech data) for routing and input processing to a document of the third application ($APP_3$), while at substantially the same time, the secondary subcomponent selects a third input ($INPUT_3$) (e.g., handwriting data) for routing and input processing to the same document of the third application ($APP_3$).

Where the user interacts with the system to cause the multimodal input data, the selection component 306 further facilitates selection of the data input that is active at any point in time. In a simple scenario, only one of the inputs is active at a time. In a more complex scenario, any two or more of the inputs can be passing data at a time. For example, it is to be appreciated that the user can be talking while handwriting. Similarly, the user can be capturing image data while voicing speech that will become associated with the image data.

Figure 5:
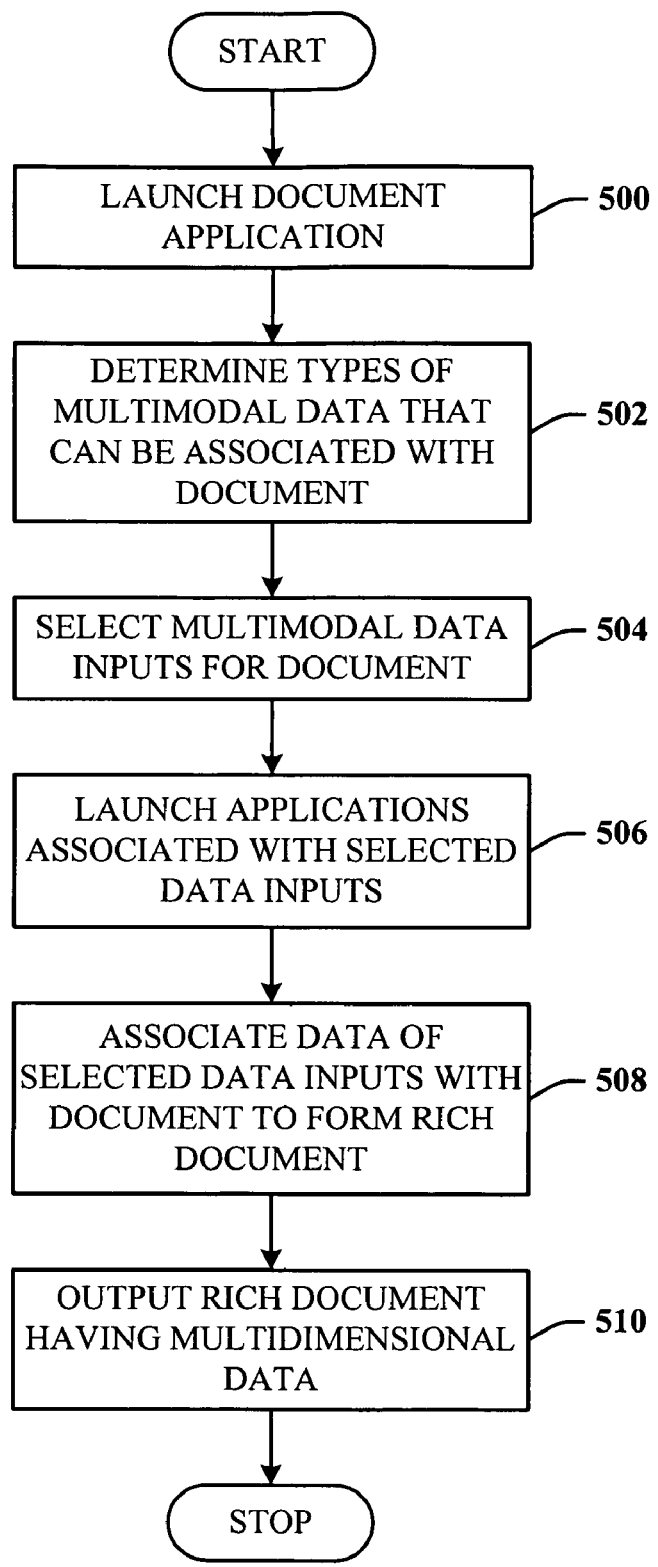
FIG. 5 illustrates a methodology of selecting multimodal data input for an application in accordance with an aspect of the innovation.

FIG. 5 illustrates a methodology of selecting multimodal data input for an application in accordance with an aspect of the innovation. At 500, a document application is launched. At 502, the type(s) of multimodal data (e.g., image, video, speech, handwriting, ...) compatible with the application is determined. At 504, the appropriate multimodal inputs are selected for input processing. At 506, applications that further process the data types associated with the selected multimodal inputs are launched. At 508, the appropriate multimodal data is processed and associated with the document to form a rich document of multidimensional levels of data. At 510, the rich document is output.

Figure 6:
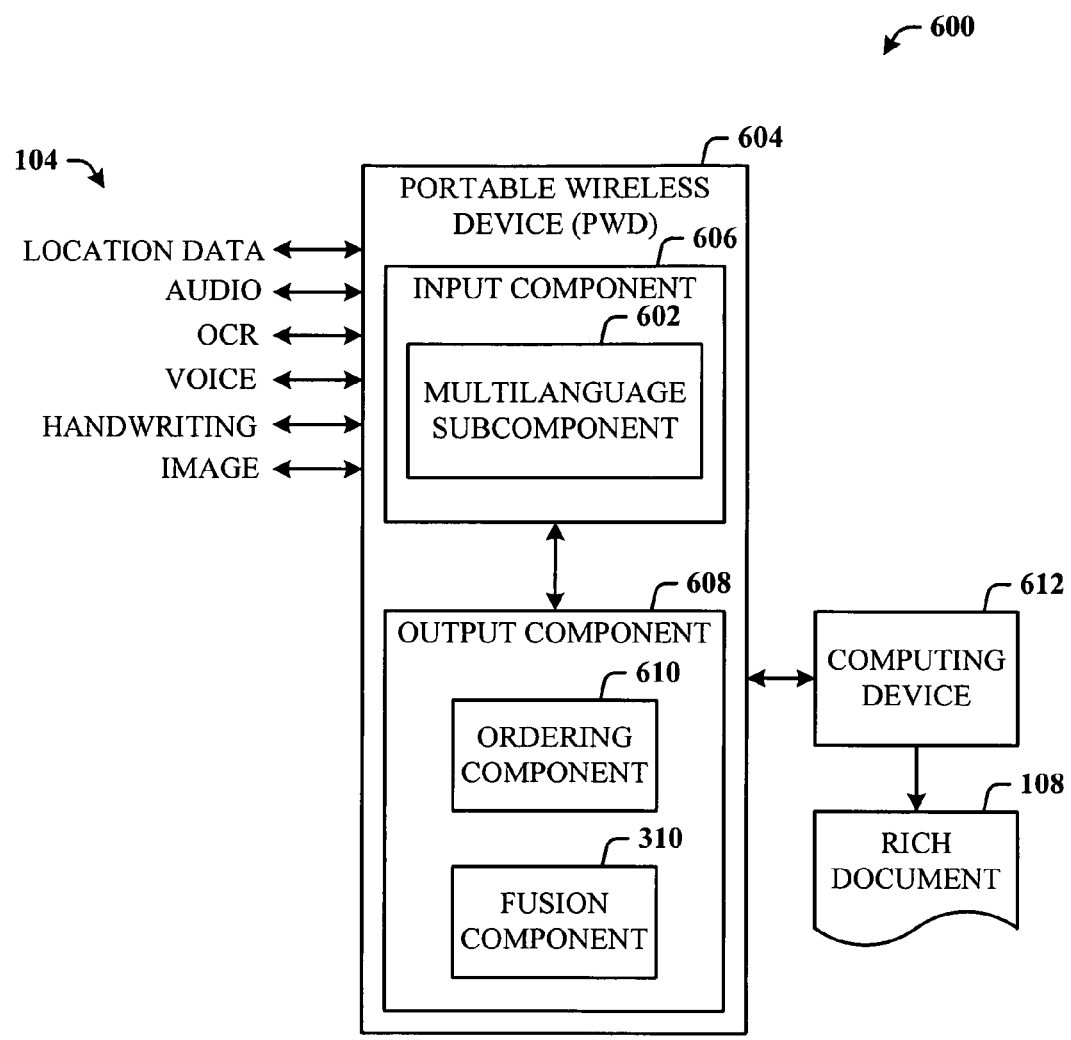
FIG. 6 illustrates a system that employs a multilanguage subcomponent in accordance with an aspect of the innovation.

Referring now to FIG. 6, there is illustrated a system 600 that employs a multilanguage subcomponent 602 in accordance with an aspect of the innovation. Thus, a user can input speech in one of many different languages, and which will be processed and "understood" for rich document output. Here, a portable wireless device (PWD) 604 is suitably designed to receive a variety of different types of input 104. For example, a voice (or speech) input operates to receive user voice signals in the form of spoken words and/or vocalized song. The voice signals are received into an input component 606, that further includes as one of its subsystems, the multilanguage subcomponent 602.

The multilanguage subcomponent 602 can process the voice signals from any language of the user into the corresponding text of that language for association with the rich document 108. Once processed by the input component 606, the processed language data is passed to an output component 608 (similar to output components 106 and 308) where it is formatted, and ordered by an ordering component 610 according to the order in which is was received into the PWD 604, relative to the other inputs 108, for final input to the rich document 108. For example, if the voice signals were input after an image was captured for input, the ordering component 610 associates the voice signals with the rich document at a point in time later than the image data. Thus, when the user retrieves and causes the rich document to be presented via a display, for example, the image would appear before the converted language text, or near the beginning of where the text begins. The output component 608 can include the fusion component 310 which fuses the ordered inputs into an output format.

In this particular scenario, the rich document 108 is output from the PWD 604 indirectly through a computing device 612. Thus, the rich document 108 can be transmitted to the computing device 612 for presentation thereby, or output printing therefrom. In other words, when the rich document 108 is transmitted to the computing device 612, the associated image data, voice data, audio data, location data, OCR data, and/or handwriting data is also transmitted such that the computing device can make full presentation of the rich document data.

Figure 7:
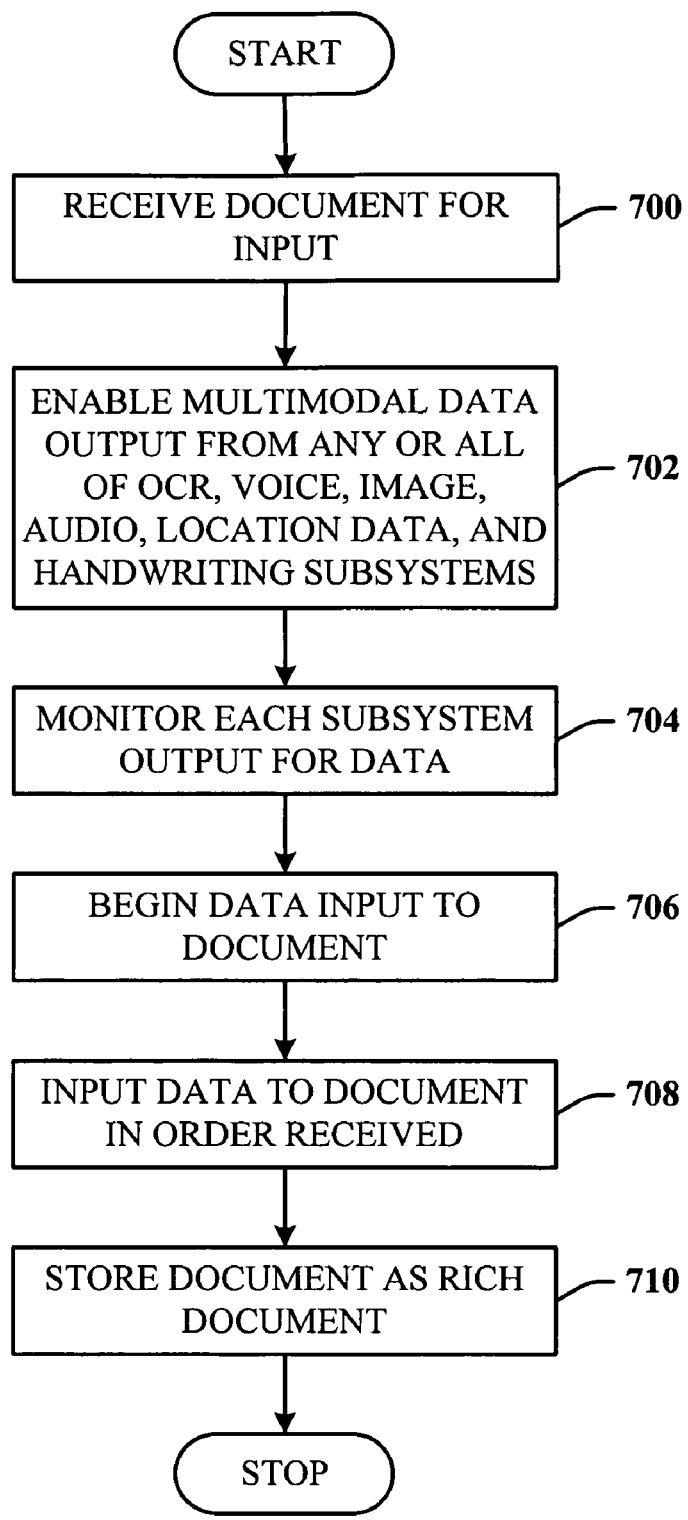
FIG. 7 illustrates a methodology of receiving data into a document in accordance with an innovative aspect.

FIG. 7 illustrates a methodology of receiving data into a document in accordance with an innovative aspect. At 700, a document is received for input. This can occur by the user selecting an application for user interaction. For example, if the user opens a spreadsheet application, the initial document can be a spreadsheet, into which the data will be embedded and/or associated. At 702, data output is enabled from any or all of the available data inputs (e.g., voice, image, video, handwriting, OCR, ...). At 704, the system is configured to monitor each input for data. At 706, the user causes data to be received from one or more of the data inputs, into the initial document. At 708, data is input into the initial document in the order in which it was received. At 710, the initial document is now stored as rich document with all associated data.

Figure 8:
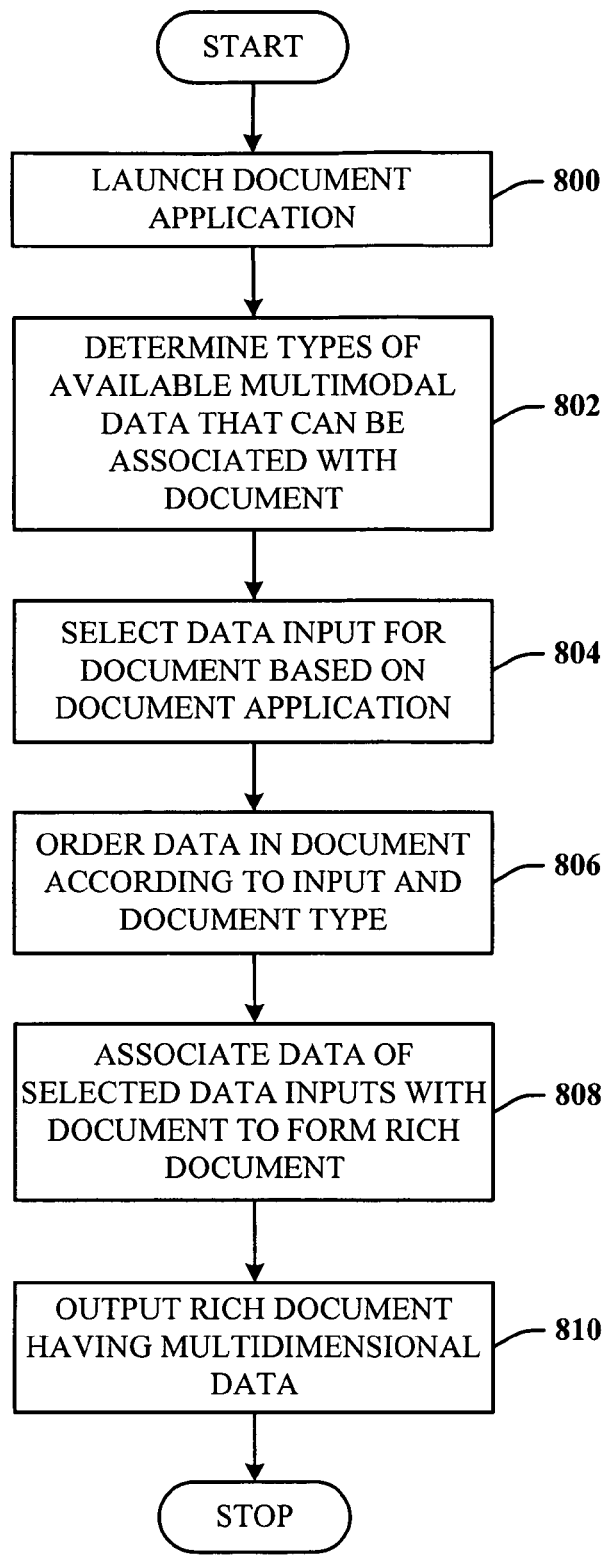
FIG. 8 illustrates a methodology of data ordering in the rich document in accordance with an aspect of the innovation.

FIG. 8 illustrates a methodology of data ordering in the rich document in accordance with an aspect of the innovation. At 800, the application associated with the initial document is launched. At 802, the system determines the types of available multimodal data that can be associated with the document. For example, it is to be understood that not all types of input data may be suitable for associating with the document. At 804, the suitable data inputs are selected based on the application and document. At 806, data is received into the document and ordered according to the time the input was received and the data type, and can be further so some criteria and/or user definable rules. For example, the system can include a rules engine (not shown) that is user configurable such that all images input to the document will be associated near the top of the rich document, while video clips will be associated near the bottom of the rich document. At 808, data from all available and selected inputs is formatted and associated with the document to from the rich document. At 810, the rich document is output with the multidimensional data.

Figure 9:
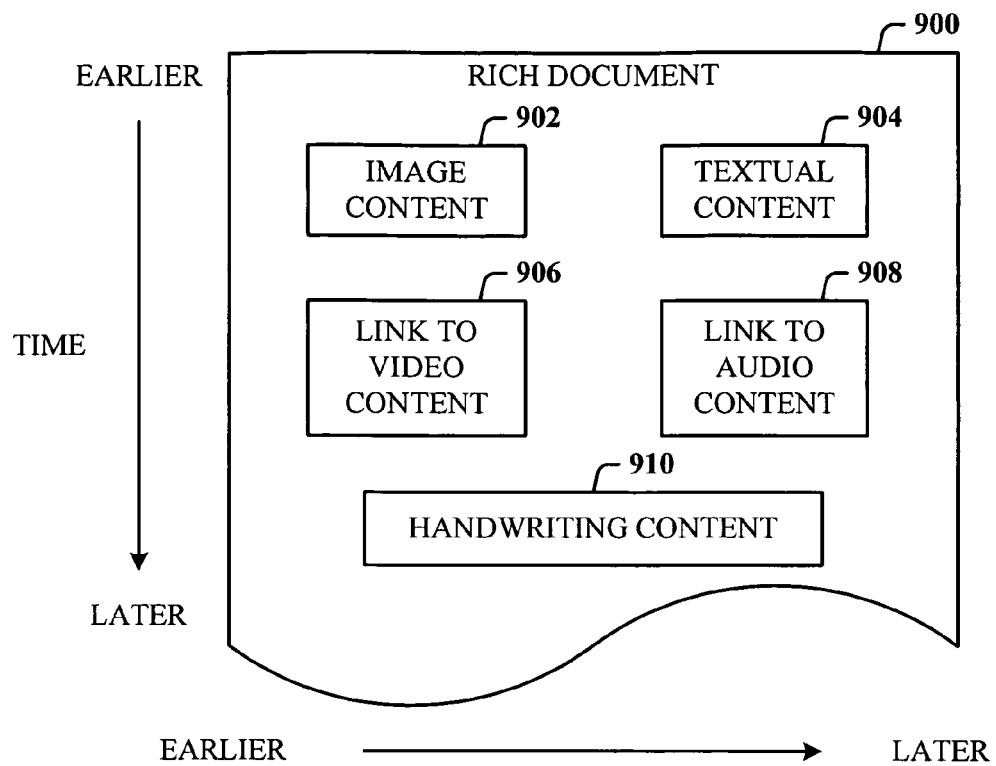
FIG. 9 illustrates an examplary rich document where data is input according to the time in which it was received.

FIG. 9 illustrates an exemplary rich document 900 where data is input according to the time in which it was received. Here, image content 902 was received first in time, and is presented as positioned in the upper left corner of the rich document 900. In this scenario, time on the vertical axis ages from top to bottom (earlier to later), and on the horizontal axis, left or right (earlier to later). The next data received is textual content 904 that is positioned to the right of the image content 902, which is later in time. Received into the document at a later time than the textual content, is video content. Such video content can be accessed by a video content link 906, which the user selects to enable presentation of the associated video file. The next data received into the document 900 is audio data (e.g., speech, music, . . . ), which is placed as a link 908 to the right of the video link 906. As with the video data, the audio data can be accessed by selecting the link for presentation of the audio data. Finally, handwriting content 910 is received and placed after (or below) the audio link 908.

Figure 10:
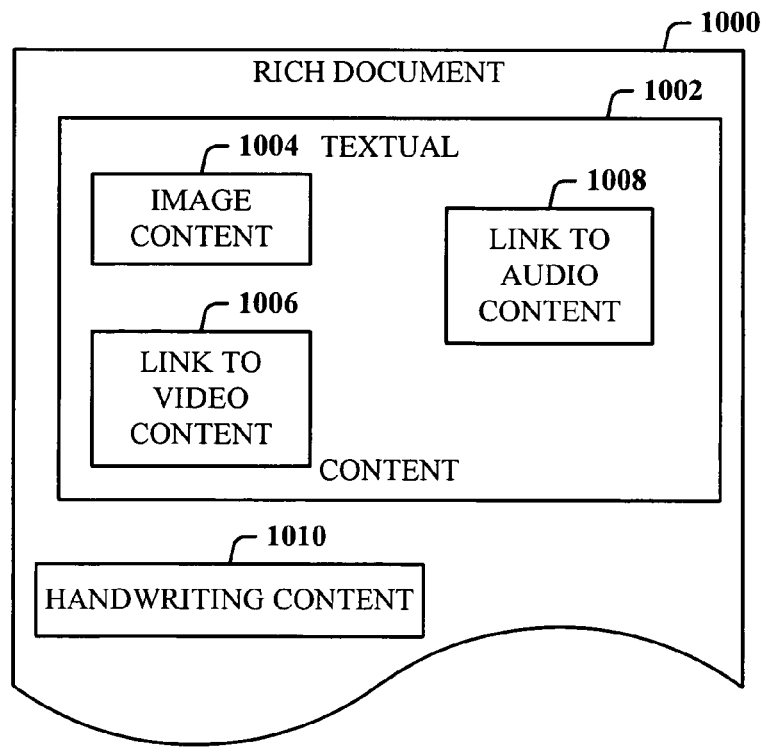
FIG. 10 illustrates an examplary rich document where data is input according to manual and/or automatic placement.

FIG. 10 illustrates an examplary rich document 1000 where data is input according to manual and/or automatic placement. For example, as a user voices information, the voiced information can be converted into textual content 1002 and inserted into the document 1000. However, it is also to be appreciated that while the user speaks, and the text is added to the document, the user can also, for example, capture image content 1004 (e.g., a picture) that is then placed into the text at an approximate location as to when the corresponding spoken words were voiced. This facilitates note-taking and annotation of the document 1000. Similarly, as the user continues to input voice signals, the user can trigger capture of video content 1006 which is then automatically placed into the document 1002 at the approximate location of the corresponding converted text of the relevant voice signals, as a link that when selected, retrieves and plays the video content. The user can also manually trigger input of an audio link 1008 at a desired place in the text 1002 for audio annotation. FIG. 10 illustrates that handwriting content 1010 can be input outside of the textual content 1002.

Figure 11:
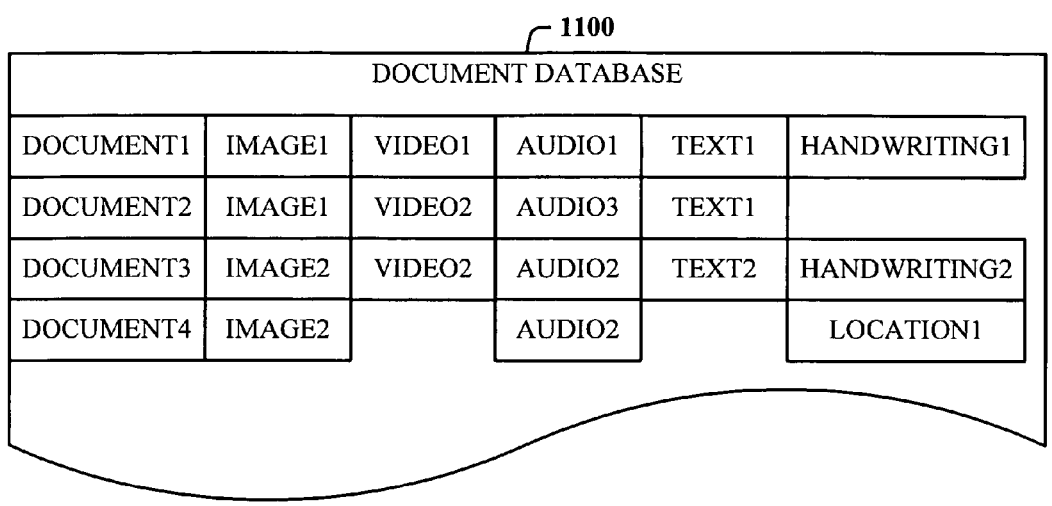
FIG. 11 illustrates an exemplary database structure that stores the rich document and its associated data, and which can be searched in another innovative aspect.

FIG. 11 illustrates an exemplary database structure 1100 that stores the rich document and its associated data, and which can be searched in another innovative aspect. The database 1100 includes a table, for example, that lists the document name (e.g., DOCUMENT1, DOCUMENT2, . . . ), and the following content of the corresponding document: image content (denoted IMAGE1, IMAGE2, . . . ), video content (denoted VIDEO1, VIDEO2, . . . ), audio content (denoted AUDIO1, AUDIO2, . . . ), textual content (denoted TEXT1, TEXT2, . . . ) derived from raw text input, converted voice signals, and/or OCR data, and handwriting content (denoted HANDWRITING1, HANDWRITING2, . . . ), to name just a few types of the content that can be included in the rich document of the subject innovation.

Thus, a document can be searched not only by the document name, but by the content it contains. For example, the user can search for all documents that contain video content VIDEO2. This will retrieve DOCUMENT2 and DOCUMENT3. Similarly, a search for rich documents that contain TEXT1 will return DOCUMENT1 and DOCUMENT2. It is further to be appreciated that the search can include multiple terms to refine the number of documents that can be returned. For example, all documents that contain IMAGE1 and TEXT1 will return DOCUMENT1 and DOCUMENT2.

Figure 12:
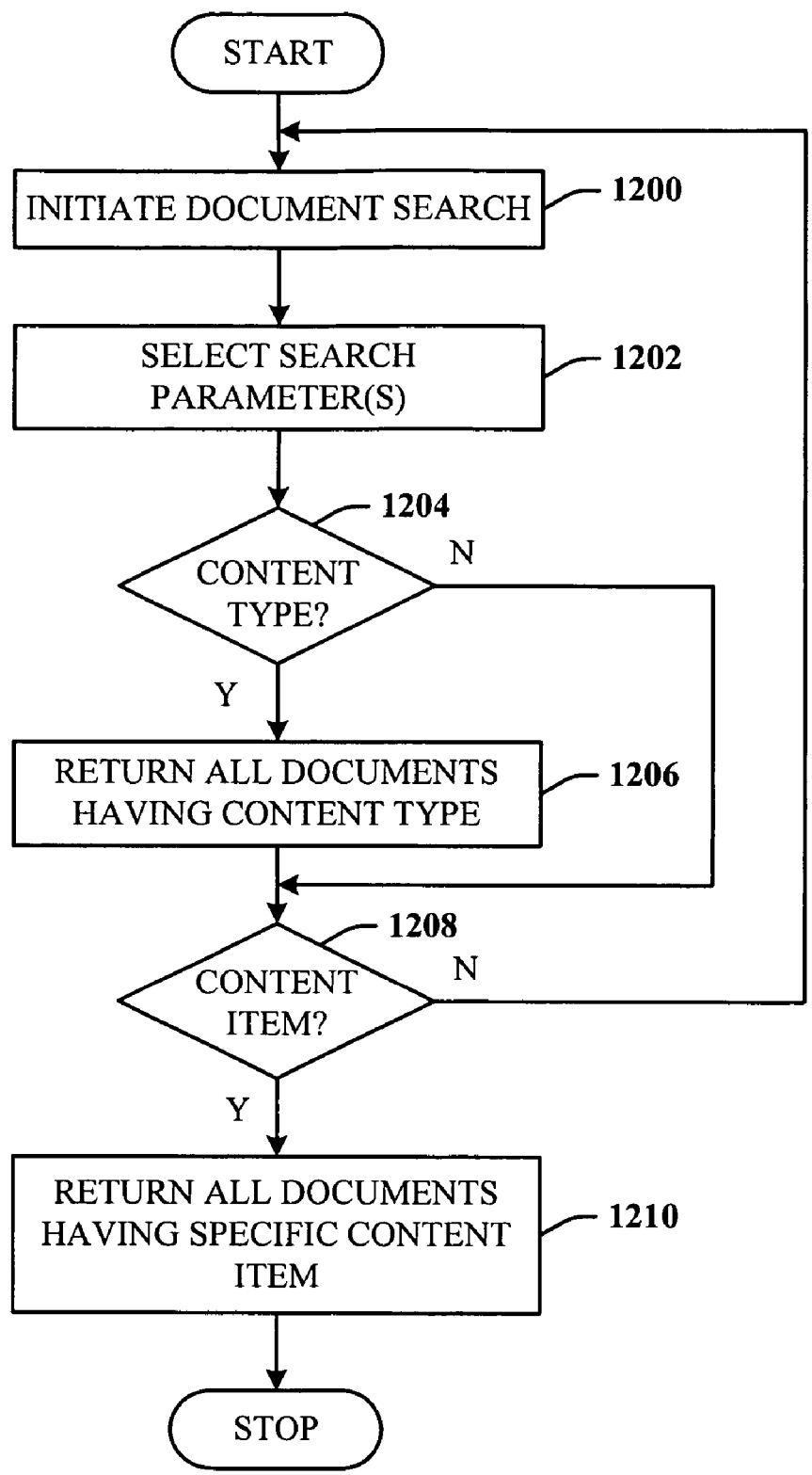
FIG. 12 illustrates a methodology of searching rich documents.

FIG. 12 illustrates a methodology of searching rich documents. At 1200, a document search is initiated. At 1202, the user inputs the search terms for the query. At 1204, the user determines if a content type search term will be used. If so, flow proceeds to 1206, where the search will return all documents having the desired content type search term. Flow is then to 1208, where the user can decide to refine the search results by using a content item search term. If the user chooses to refine the search results by using a content item term, flow is to 1210, where the search engine returns only those items that also include the selected content item. It is to be appreciated that the search operation described herein is not limited to searching separately for each term, but, a described supra, the user can insert a string of search terms which are then processed together to return the desired document(s).

Figure 13:
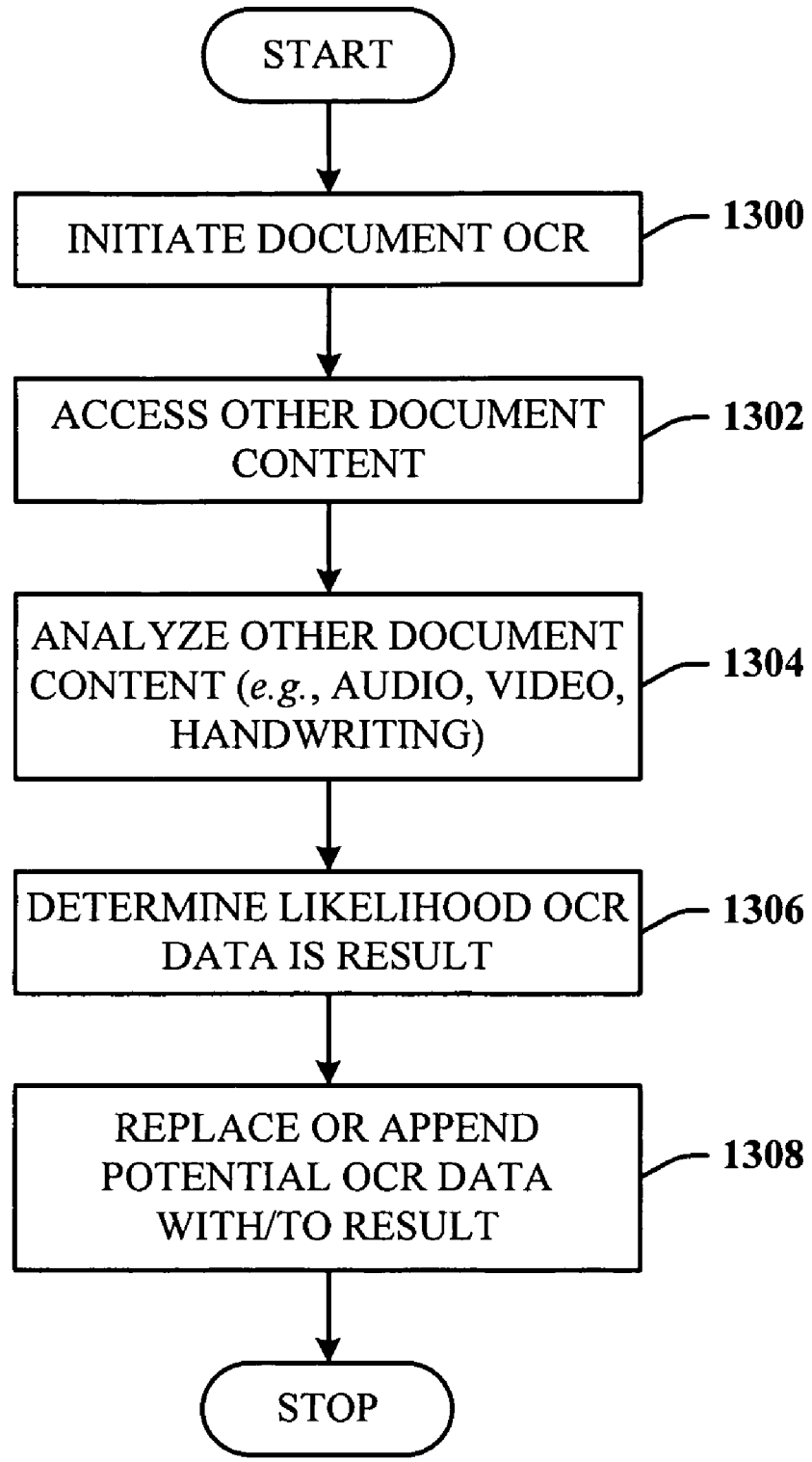
FIG. 13 illustrates a methodology of improving the accuracy of OCR data by employing clues from other information sources.

FIG. 13 illustrates a methodology of improving the accuracy of OCR data by employing clues from other information sources. At 1300, OCR data is input to the document. At 1302, the system accesses other document content and/or associated content metadata to determine a clue or clues as to what the potential OCR data may be. For example, if it is determined that from content metadata that the OCR process occurred at or about a certain time, the time information can be compared against other document content time information to approximate what the OCR data should be to improve OCR accuracy. For example, if the OCR error is "Sa*&y #ea*h," and the other content of the document indicates that an image of a beach was captured, and converted handwriting indicated "Sincerely, from a warm, white, sandy beach", it may be inferred with some degree of certainty that the OCR data could be "Sandy beach." Accordingly, at 1304, other document content can be analyzed for clues. At 1306, the likelihood that the OCR data is correct is computed. At 1308, the OCR data can be notated in some way, such that the data is replaced, or the result is appended to the data for user review.

It is to be appreciated that although the OCR data may be incorrect, it can still be meaningful in some way. In that case, other inputs can be employed to help resolve the incorrect data. For example, suppose the OCR returns result "507" while speech recognition returns result "587". If the confidence of OCR for character "0" is much lower than the confidence of the speech recognition, it can be concluded that the correct answer for that character should be "8" instead of "0". The fusion component described supra facilitates combining OCR data, speech recognition data, and other contextual information from location, photos, etc., to improve the recognition accuracy.

Figure 14:
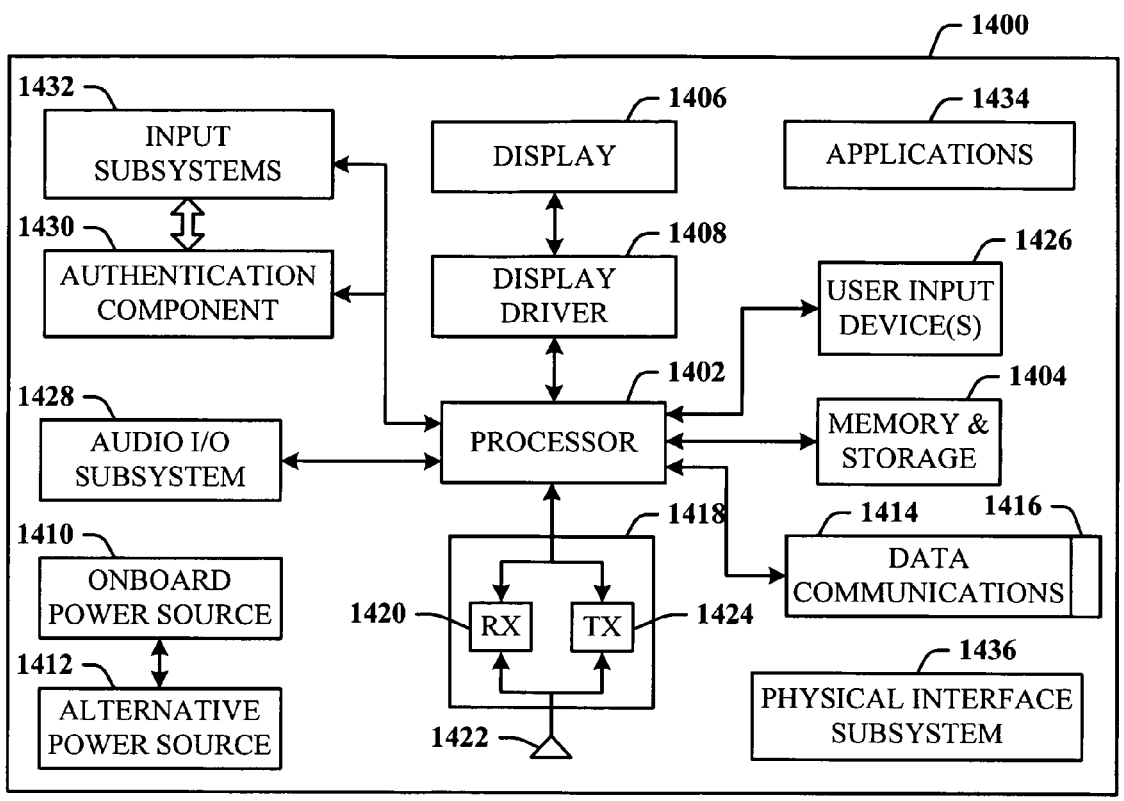
FIG. 14 illustrates a schematic block diagram of a portable wireless device that facilitates generation of a rich document according to one aspect of the subject innovation.

FIG. 14 illustrates a schematic block diagram of a portable wireless device 1400 that facilitates generation of a rich document according to one aspect of the subject innovation. The device 1400 includes a processor 1402 that interfaces to one or more internal components for control and processing of data and instructions. The processor 1402 can be programmed to control and operate the various components within the device 1400 in order to carry out the various functions described herein. The processor 1402 can be any of a plurality of suitable processors (e.g., a DSP-digital signal processor), and can be a multiprocessor subsystem.

A memory and storage component 1404 interfaces to the processor 1402 and serves to store program code, and also serves as a storage means for information such as data, applications, services, metadata, device states, and the like. The memory and storage component 1404 can include non-volatile memory suitably adapted to store at least a complete set of the sensed data that is acquired from the sensing subsystem and/or sensors. Thus, the memory 1404 can include RAM or flash memory for high-speed access by the processor 1402 and/or a mass storage memory, e.g., a micro drive capable of storing gigabytes of data that comprises text, images, audio, and/or video content. According to one aspect, the memory 1404 has sufficient storage capacity to store multiple sets of information relating to disparate services, and the processor 1402 can include a program that facilitates alternating or cycling between various sets of information corresponding to the disparate services.

A display 1406 can be coupled to the processor 1402 via a display driver subsystem 1408. The display 1406 can be a color liquid crystal display (LCD), plasma display, touch screen display, or the like. The display 1406 functions to present data, graphics, or other information content. Additionally, the display 1406 can present a variety of functions that are user selectable and that provide control and configuration of the device 1400. In a touch screen example, the display 1406 can display touch selectable icons that facilitate user interaction for control and/or configuration.

Power can be provided to the processor 1402 and other onboard components forming the device 1400 by an onboard power system 1410 (e.g., a battery pack or fuel cell). In the event that the power system 1410 fails or becomes disconnected from the device 1400, an alternative power source 1412 can be employed to provide power to the processor 1402 and other components (e.g., sensors, image capture device, . . . ) and to charge the onboard power system 1410, if a chargeable technology. For example, the alternative power source 1412 can facilitate interface to an external a grid connection via a power converter. The processor 1402 can be configured to provide power management services to, for example, induce a sleep mode that reduces the current draw, or to initiate an orderly shutdown of the device 1400 upon detection of an anticipated power failure.

The device 1400 includes a data communications subsystem 1414 having a data communications port 1416, which port 1416 is employed to interface the device 1400 to a remote computing system, server, service, or the like. The port 1416 can include one or more serial interfaces such as a Universal Serial Bus (USB) and/or IEEE 1394 that provide serial communications capabilities. Other technologies can also be included, but are not limited to, for example, infrared communications utilizing an infrared communications port, and wireless packet communications (e.g., Bluetooth™, Wi-Fi, and Wi-Max). If a smartphone, the data communications subsystem 1414 can include SIM (subscriber identity module) data and the information necessary for cellular registration and network communications.

The device 1400 can also include a radio frequency (RF) transceiver section 1418 in operative communication with the processor 1402. The RF section 1418 includes an RF receiver 1420, which receives RF signals from a remote device or system via an antenna 1422 and can demodulate the signal to obtain digital information modulated therein. The RF section 1418 also includes an RF transmitter 1424 for transmitting information (e.g., data, service(s)) to a remote device or system, for example, in response to manual user input via a user input device 1426 (e.g., a keypad), or automatically in response to detection of entering and/or anticipation of leaving a communication range or other predetermined and programmed criteria.

The device 1400 can also include an audio I/O subsystem 1428 that is controlled by the processor 1402 and processes voice input from a microphone or similar audio input device (not shown). The audio subsystem 1428 also facilitates the presentation of audio output signals via a speaker or similar audio output device (not shown).

The device 1400 can also include an authentication component 1430 that interfaces to the processor, and facilitates authentication of a user to the device itself and/or to a remote system. The processor 1402 also interfaces to an input subsystems block 1432 that facilitates input of the OCR data, voice data, handwriting data, and image/video data, for example. Additionally, the device 1400 include one or more applications 1434 (e.g., spreadsheet, word processing, presentation, e-mail, . . . ) that can be launched to initiate document creation and content input in accordance with the innovative architecture.

The device 1400 can also include a physical interface subsystem 1436 that allows direct physical connection to another system (e.g., via a connector), rather than by wireless communications or cabled communications therebetween.

Figure 15:
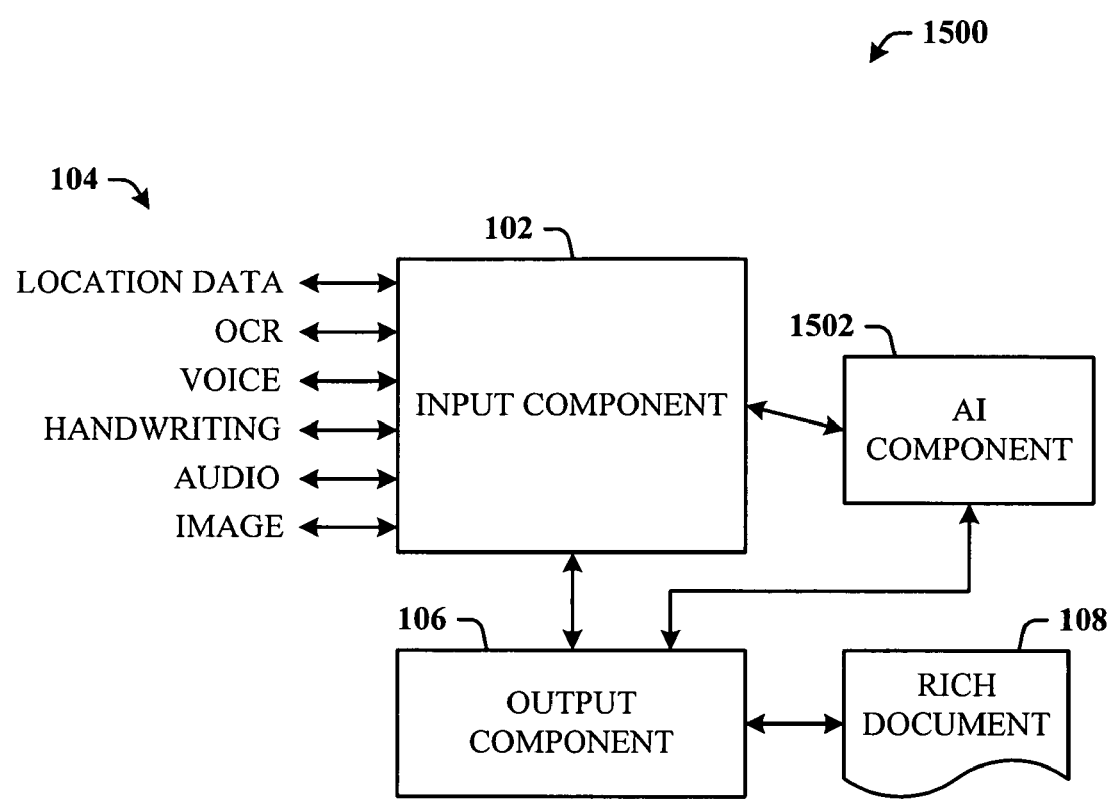
FIG. 15 illustrates a system that employs an artificial intelligence component which facilitates automating one or more features in accordance with the subject innovation.

FIG. 15 illustrates a system 1500 that employs an artificial intelligence (AI) component 1502 which facilitates automating one or more features in accordance with the subject innovation. The subject invention (e.g., in connection with selection) can employ various AI-based schemes for carrying out various aspects thereof. For example, a process for determining which of the inputs 104 to enable for data input for a given application can be facilitated via an automatic classifier system and process.

A classifier is a function that maps an input attribute vector, $x=(x1, x2, x3, x4, xn)$,), to a class label class(x). The classifier can also output a confidence that the input belongs to a class, that is, $f(x)=confidence(class(x))$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. The AI component 1502 interfaces to both the input component 102 and the output component 106 to monitor respective operations and data, and to facilitate control thereof for the output of the rich document 108. Thus, the classifier(s) can be employed to automatically learn and perform a number of functions, including but not limited to determining according to a predetermined criteria how a given user prefers to have content placed in the rich document 108. For example, the AI component 1502 can learn that the user had recently changed content placement by allowing the system 1500 to automatically place content, but thereafter the user manually moves the content around to other positions. Over time, the AI component 1052 can learn that based on recent data, the user will likely choose to have the content placed according to he manual placement, and then automatically control the output component 106 to cause placement of the content accordingly or the previously-placed by the user placement.

In another example, the AI component 1502 can learn and automate user interaction based on the most likely input. If the user tends to prefer speech input over image input, as evident by past user interaction, the AI component 1502 can anticipate this and configure the system 1500 to prepare for such user interaction by configuring and caching programs that process images, and so on.

In yet another example, if it the user has provided some indication that they are on vacation, the AI component 1502 can infer that the user will prefer image and/or video content as a primary source of document input, and make system and application configurations accordingly. This can include prioritizing input monitoring more on speech and image inputs instead of OCR and handwriting inputs, for example.

Figure 16:
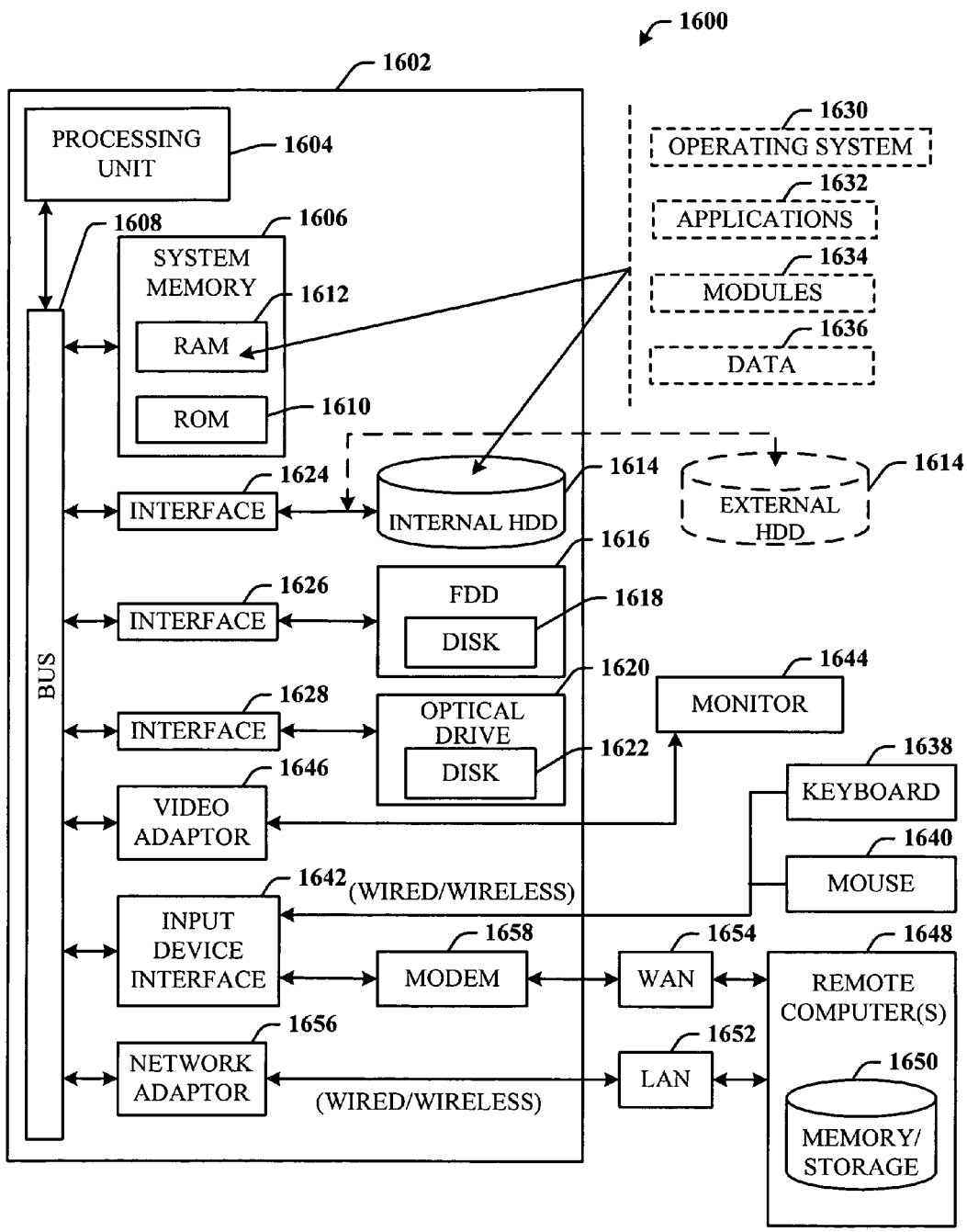
FIG. 16 illustrates a block diagram of a computer operable to execute the disclosed multimodal architecture.

Referring now to FIG. 16, there is illustrated a block diagram of a computer operable to execute the disclosed multimodal architecture. In order to provide additional context for various aspects thereof, FIG. 16 and the following discussion are intended to provide a brief, general description of a suitable computing environment 1600 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 16, the exemplary environment 1600 for implementing various aspects includes a computer (or computing device) 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multiprocessor architectures may also be employed as the processing unit 1604.

The system bus 1608 can be any of several types of bus structure that may further interconnect to a memory bus (with or without a memory controller), a peripheral bus, and a local bus using any of a variety of commercially available bus architectures. The system memory 1606 includes read-only memory (ROM) 1610 and random access memory (RAM) 1612. A basic input/output system (BIOS) is stored in a non-volatile memory 1610 such as ROM, EPROM, EEPROM, which BIOS contains the basic routines that help to transfer information between elements within the computer 1602, such as during start-up. The RAM 1612 can also include a high-speed RAM such as static RAM for caching data.

The computer 1602 further includes an internal hard disk drive (HDD) 1614 (e.g., EIDE, SATA), which internal hard disk drive 1614 may also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is to be appreciated that the innovation can be implemented with various commercially available operating systems or combinations of operating systems.

A user can enter commands and information into the computer 1602 through one or more wired/wireless input devices, e.g., a keyboard 1638 and a pointing device, such as a mouse 1640. Other input devices (not shown) may include a microphone, an IR remote control, a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 1394 serial port, a game port, a USB port, an IR interface, etc.

A monitor 1644 or other type of display device is also connected to the system bus 1608 via an interface, such as a video adapter 1646. In addition to the monitor 1644, a computer typically includes other peripheral output devices (not shown), such as speakers, printers, etc.

The computer 1602 may operate in a networked environment using logical connections via wired and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which may connect to a global communications network, e.g., the Internet.

When used in a LAN networking environment, the computer 1602 is connected to the local network 1652 through a wired and/or wireless communication network interface or adaptor 1656. The adaptor 1656 may facilitate wired or wireless communication to the LAN 1652, which may also include a wireless access point disposed thereon for communicating with the wireless adaptor 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 via the serial port interface 1642. In a networked environment, program modules depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 17:
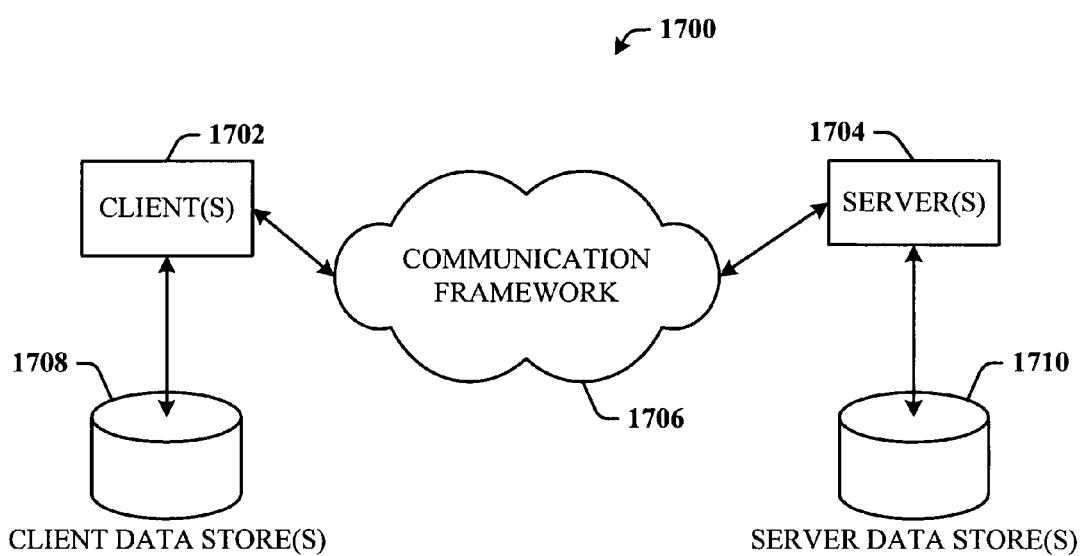
FIG. 17 illustrates a schematic block diagram of an exemplary computing environment in which multimodal note-taking, annotation, and gaming can be facilitated in accordance with another aspect.

Referring now to FIG. 17, there is illustrated a schematic block diagram of an exemplary computing environment 1700 in which multimodal note-taking, annotation, and gaming can be facilitated in accordance with another aspect. The system 1700 includes one or more client(s) 1702. The client(s) 1702 can be hardware and/or software (e.g., threads, processes, computing devices). The client(s) 1702 can house cookie(s) and/or associated contextual information by employing the subject innovation, for example.

The system 1700 also includes one or more server(s) 1704. The server(s) 1704 can also be hardware and/or software (e.g., threads, processes, computing devices). The servers 1704 can house threads to perform transformations by employing the invention, for example. One possible communication between a client 1702 and a server 1704 can be in the form of a data packet adapted to be transmitted between two or more computer processes. The data packet may include a cookie and/or associated contextual information, for example. The system 1700 includes a communication framework 1706 (e.g., a global communication network such as the Internet) that can be employed to facilitate communications between the client(s) 1702 and the server(s) 1704.

Communications can be facilitated via a wired (including optical fiber) and/or wireless technology. The client(s) 1702 are operatively connected to one or more client data store(s) 1708 that can be employed to store information local to the client(s) 1702 (e.g., cookie(s) and/or associated contextual information). Similarly, the server(s) 1704 are operatively connected to one or more server data store(s) 1710 that can be employed to store information local to the servers 1704.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data processing, comprising:
   a processor; and
   a memory, on which are stored processor-executable instructions, which when executed by the processor result in operation of an input component and an output component;

wherein the input component receives a plurality of different types of input data;
wherein the output component processes the plurality of different types of input data into a document to generate a rich document having a multidimensional level of data; and
wherein a text document is received by the input component and is processed by an optical character recognition (OCR) subsystem of the input component to produce optically recognized characters, wherein the input component utilizes at least one additional document according to the plurality of different types of input data received, having content that is related to the text document, to verify accuracy of the optically recognized characters, and wherein the verification comprises:
initiating OCR of the text document to generate the optically recognized characters;
determining a likelihood that the optically recognized characters are correct;
accessing the at least one additional document, wherein the at least one additional document is an image document;
analyzing content of the additional document; and
replacing optically recognized characters according to data from the additional document when indicated by the analysis and the likelihood.

2. The system of claim 1, wherein the plurality of different types of input data processed by the input component includes at least one of voice data and audio data.

3. The system of claim 1, wherein the plurality of different types of input data processed by the input component includes at least one of handwriting data and location data.

4. The system of claim 1, wherein the plurality of different types of input data processed by the input component includes image data.

5. The system of claim 1, further comprising an artificial intelligence component that employs a probabilistic and/or statistical-based analysis to prognose or infer an action that a user desires to be automatically performed.

6. A portable computing device that employs the system of claim 1 for note-taking, annotation, and gaming.

7. The system of claim 1, further comprising an ordering component that facilitates orderly placement of the plurality of different types of input data into the document according to the time that it was received.

8. The system of claim 1, further comprising an ordering component that facilitates placement of the plurality of different types of input data into the document according to user preferences.

9. The system of claim 1, further comprising a selection component that facilitates selection of one of the plurality of different types of input data based on an application.

10. The system of claim 1, further comprising a multilanguage component that processes speech input and facilitates output of textual content in the rich document that represent the speech input.

11. A computer-implemented method of data processing, the method comprising:
receiving a plurality of different types of input data;
selecting one or more of the plurality of different types of input data according to an application;
associating the one or more of the plurality of different types of input data with a document;
fusing the one or more of the plurality of different types of input data into a fused output with a fusion component, wherein the fusing of the plurality of different types of input data comprises:
utilizing at least one additional document to verify accuracy of optical character recognition (OCR) of a text document to be fused, and wherein the verification comprises:
initiating OCR of the text document to generate the optically recognized characters;
determining a likelihood that the optically recognized characters are correct;
accessing the at least one other document, wherein the at least one other document is an image document;
analyzing content of the other document; and
replacing optically recognized characters according to data from the other document when indicated by the analysis and the likelihood; and
outputting a rich document having associated therewith the fused output of the one or more of the plurality of different types of input data.

12. The method of claim 11, further comprising an act of searching a database according to the one or more of the plurality of different types of input data associated with the rich document.

13. The method of claim 11, further comprising an act of launching a compatible application based on the one or more of the plurality of different types of input data selected.

14. The method of claim 11, wherein the one or more of the plurality of different types of input data include at least two of textual data, image data, video data, audio data, speech data, and OCR data.

15. The method of claim 11, further comprising an act of activating video content of the rich document by selecting of an associated video link.

16. The method of claim 11, wherein the further comprising an act of selecting the one or more of the plurality of different types of input data based on a type of the document.

17. The method of claim 11, wherein the further comprising an act of embedding at least one of image data, video data, and audio data in textual data of the rich document.

18. A system that facilitates data processing, comprising:
a processor;
a memory, on which are stored processor-executable instructions, which when executed by the processor result facilitates data processing;
means for receiving a plurality of different types of input data for document processing;
means for verifying accuracy of a text document, from among the plurality of different types of input data received by the means for receiving, wherein the text document is processed by an optical character recognition (OCR) algorithm to produce optically recognized characters, wherein at least one additional document having content that is related to the text document is used to verify accuracy of the OCR algorithm, and wherein the verification comprises:
initiating OCR of the text document to generate the optically recognized characters;
determining a likelihood that the optically recognized characters are correct;
accessing the at least one other document, wherein the at least one other document is an image document;
analyzing content of the other document; and
replacing optically recognized characters according to data from the other document when indicated by the analysis and the likelihood;
means for associating the plurality of different types of input data with a document;

means for placing the plurality of different types of input data in the document according to a predetermined order;

means for changing one input data based on analysis of other input data; and means for outputting a rich document having associated therewith the changed input data and the other input data.

* * * * *